United States Patent [19]

Okamoto

[11] Patent Number: 5,272,705
[45] Date of Patent: Dec. 21, 1993

[54] SEMICONDUCTOR INTEGRATED CIRCUIT DEVICE

[75] Inventor: Yasushi Okamoto, Hyogo, Japan

[73] Assignee: Mitsubishi Denki Kabushiki Kaisha, Tokyo, Japan

[21] Appl. No.: 865,037

[22] Filed: Apr. 7, 1992

[30] Foreign Application Priority Data

Apr. 15, 1991 [JP] Japan .................................. 3-082122

[51] Int. Cl.$^5$ .......................... G06F 11/00; H04L 1/14
[52] U.S. Cl. .................................. 371/20.5; 371/68.2; 371/71; 370/15
[58] Field of Search ................. 377/39; 371/20.5, 67.1, 371/68.2, 71; 370/15; 375/10; 395/575

[56] References Cited

U.S. PATENT DOCUMENTS

| | | | |
|---|---|---|---|
| 3,743,938 | 7/1973 | Davis | 371/20.5 |
| 4,456,997 | 6/1984 | Spitza | 371/68.2 |
| 4,864,531 | 9/1989 | Quatse et al. | 371/67.1 |
| 5,060,226 | 10/1991 | Gewin et al. | 371/20.5 |

Primary Examiner—John S. Heyman
Attorney, Agent, or Firm—Oblon, Spivak, McClelland, Maier, & Neustadt

[57] ABSTRACT

A P-to-S shift register (61) includes nine R-S-FFs (70-78) serially connected. At the H level rising edge of a P-to-S shift register clock (T2), latch data of the FFs (70-77) are shifted rightwardly to their adjacent FFs (71-78), whereby a serial data (D1) from the FF (78) is outputted to a PWM portion and is transferred in a looped manner to the FF (70). Based on a delay time generated between the serial data (D1) and a demodulated serial data (D5), a comparator (63) compares the Q output (Q70) of the FF (70) in the P-to-S shift register (61) with the Q output (Q80) of the FF (80) in the S-to-P shift register (62) to output an echo back data (D9) based on a comparison result.

The necessity for providing a comparison portion (53) with specialized registers is eliminated, so that the chip size can be reduced.

6 Claims, 7 Drawing Sheets

SEMICONDUCTOR INTEGRATED CIRCUIT DEVICE

BACKGROUND OF THE INVENTION

1. Field of the Invention

The present invention relates to a semiconductor integrated circuit device having an echo back comparison function.

2. Description of the Background Art

A collision detect method is one of the methods of controlling bus competition generated in a network capable of interchanging information between a plurality of devices connected to an external bus. In the collision detect method, each of the devices connected to the external bus outputs a transmission data indicative of the priority of its own to the external bus. The data outputted to the external bus is echoed back, that is, is inputted to each of the devices as a reception data. When the comparison between the transmission and reception data results in disagreement, the transmission of the data is interrupted. For execution of the collision detect method, a communication LSI having an echo back comparison function is needed.

FIG. 6 is a block diagram of the internal structure of a transmitter-receiver portion of a conventional communication LSI having the echo back comparison function. The transmitter-receiver portion comprises a transmitter portion 1, a receiver portion 2 and a comparison portion 3. The transmitter portion 1 is connected to the receiver portion 2 through an external serial bus 4.

The transmitter portion 1 includes a transmission buffer register 11, a P-to-S (parallel to serial) shift register 12, a PWM (pulse width modulator) portion 13, and a transmission buffer 14. A transmission buffer register address A1 indicative of a serial bus to the transmission buffer register 11, which transfers a 1-byte transmission data out of the transmission buffer register address A1 to the P-to-S shift register 12 in parallel. The P-to-S shift register 12 shifts the inputted 1-byte transmission data sequentially, to thereby serially output a serial data D1 to the PWM portion 13 in due order. The PWM portion 13 performs pulse width modulation on the serial data D1 to output a modulated serial data D2 to the transmission buffer 14. The transmission buffer 14 buffers the modulated serial data D2 to output a modulated serial data D3 having the same information as the modulated serial data D2 to the serial bus 4. A transmission data load clock T1 and a P-to-S shift register clock T2 control the operation of the P-to-S shift register 12. A PWM clock T3 controls the operation of the PWM portion 13.

The receiver portion 2 includes a reception buffer register 21, a S-to-P (serial to parallel) shift register 22, a PWDM (pulse width demodulator) portion 23, a digital filter 24, and a reception buffer 25. The reception buffer 25 buffers a serial data on the serial bus 4 and outputs it to the digital filter 24. The digital filter 24 performs a filtering processing for cutting off noise components on the serial data outputted from the reception buffer 25, and outputs a serial data D4 to the PWDM portion 23. The PWDM portion 23 demodulates the serial data D4 to output a demodulated serial data D5 to the S-to-P shift register 22. The demodulated serial data D5 is serially inputted to the S-to-P shift register 22 in due order until a 1-byte reception data is formed. The 1-byte reception data is outputted from the S-to-P shift register 22 to the reception buffer register 21 in parallel. A digital filter clock T4 controls the operation of the digital filter 24. A PWDM clock T5 controls the operation of the PWDM portion 23. A S-to-P shift register clock T6 and a reception data load clock T10 control the operation of the S-to-P shift register 22. A reception buffer address A2 is applied to the reception buffer register 21.

The comparison portion 3 includes a transmission data comparing register 31, a reception data comparing register 32, and a comparator 33. While the serial data D1 outputted from the P-to-S shift register 12 of the transmitter portion 1 is serially inputted to the first latch of the transmission data comparing register 31, the data shift operation is performed in the transmission data comparing register 31. While the demodulated serial data D5 outputted from the PWDM portion 23 of the receiver portion 3 is serially inputted to the first latch of the reception data comparing register 32, the data shift operation is performed in the reception data comparing register 32. The comparator 3 compares the second latch data of the transmission data comparing register 31 with the first latch data of the reception data comparing register 32 to output an echo back data D9.

FIG. 7 is a timing chart of the echo back comparison operation of the communication LSI shown in FIG. 6. With reference to FIG. 7, the echo back comparison operation will be discussed hereinafter.

Initially, the transmission buffer register address A1 is stored in the transmission buffer register 11. Subsequently, the transmission data load clock T1 being inputted to the P-to-S shift register 12 becomes the H level. In the period in which the clock T1 is at the H level, the transmission buffer register 11 outputs the 1-byte transmission data indicated by the transmission buffer register address A1 to the P-to-S shift register 12 in parallel (assuming that 1 byte=8 bits).

The P-to-S shift register clock T2 becomes the H level. Triggered by the H level rising of the clock T2, the P-to-S shift register 12 shifts the data and serially outputs the most significant output bit data (MSB=B7) in the inputted 1-byte transmission data as serial data D1. Subsequently, the H level rising of the clock T2 triggers the shift operation of the P-to-S shift register 12, whereby the P-to-S shift register 12 serially outputs the second most to least significant output bit data (B6 to LSB=B0) in due order as serial data D1.

The PWM clock T3 becomes the H level. Triggered by the H level rising of the clock T3, the PWM portion 13 performs the pulse width modulation on the serial data D1 to output the modulated serial data D2 to the transmission buffer 14. Substantially simultaneously, the transmission buffer 14 outputs the modulated serial data D3 having the same information as the modulated serial data D2 to the serial bus 4.

A comparison portion clock T7 rises to the H level substantially simultaneously with the PWM clock T3. Triggered by the H level rising of the clock T7, the serial data D1 is serially inputted to the first latch of the transmission data comparing register 31. Subsequently, when triggered by the H level rising of the comparison portion clock T7, the latest serial data D1 is sequentially inputted to the first latch of the transmission data comparing register 31 while the previously inputted serial data D1 are shifted to the second and successive latches thereof. Only the first and second latch data S1 and S2 of the transmission data comparing register 31 are shown in FIG. 7.

The modulated serial data D3 on the serial bus 4 is transferred through the reception buffer 25 to the digital filter 24. Based on the digital filter clock T4, the digital filter 24 performs the filtering processing on the modulated serial data D3 to output the serial data D4 to the PWDM portion 23. Since the filtering processing requires the time t1, the output timing of the serial data D4 is delayed for the time t1 from the output timing of the modulated serial data D3.

The PWDM clock T5 produces an H level pulse. Based on the H level pulse of the clock T5, the PWDM portion 23 performs the pulse width demodulation on the serial data D4 to output the demodulated serial data D5 to the S-to-P shift register 22. The time t2 required for the demodulation processing is the delay time of the output timing of the demodulated serial data D5 from the output timing of the serial data D4.

The S-to-P shift register clock T6 rises to the H level. Triggered by the H level rising of the clock T6, the demodulated serial data D5 is serially inputted to the first latch of the S-to-P shift register 22. Subsequently, when triggered by the H level rising of the clock T6, the latest demodulated serial data D5 is serially inputted to the first latch of the S-to-P shift register 22 while the previously inputted data are shifted to the second and successive latches thereof.

After the input of the 1-byte reception data to the latches of the S-to-P shift register 22, the reception data load clock T10 rises to the H level (not shown in FIG. 7). Triggered by the H level rising of the clock T10, the S-to-P shift register 22 outputs the 1-byte reception data to the reception buffer register 21 in parallel.

In the comparison portion 3, the demodulated serial data D5 is inputted to the first latch of the reception data comparing register 32, when triggered by the H level rising of a reception data comparing register clock T8. Subsequently, when triggered by the H level rising of the reception data comparing register clock T8, the latest demodulated serial data D5 is sequentially inputted to the first latch of the reception data comparing register 32 while the previously inputted demodulated serial data D5 are shifted to the second and successive latches thereof. Only the first latch data R1 of the reception data comparing register 32 is shown in FIG. 7.

Triggered by the H level rising of a comparison portion clock T9, the comparator 33 compares the second latch data S2 of the transmission data comparing register 31 with the first latch data R1 of the reception data comparing register 32 to output the echo back data D9 as a result of the comparison.

In the comparison between the second latch data S2 of the transmission data comparing register 31 and the first latch data R1 of the reception data comparing register 32, consideration is given to the delay time (t1+t2) generated between the timing of the serial data D1 inputted to the transmission data comparing register 31 and the timing of the demodulated serial data D5 inputted to the reception data comparing register 32. This provides for the comparison of the corresponding output bit data (B7 (MSB) to B0 (LSB)).

The conventional communication LSI having the echo back comparison function is structured as mentioned above. The echo back comparison operation is performed in consideration of the delay time between the transmission of the serial data by the transmitter portion 1 and the reception thereof by the receiver portion 2. The comparison portion 3 must be provided with two registers, that is, the transmission data comparing register 31 for holding the transmission serial data and the reception data comparing register 32 for holding the reception serial data. There has been a problem that the number of devices accordingly increases so that the chip size becomes large.

SUMMARY OF THE INVENTION

According to the present invention, a semiconductor integrated circuit device comprises a transmitter portion including a transmission shift register, the transmission shift register shifting a stored transmission data having a predetermined number of bits in a direction from one end to the other end of the transmission data to serially output the transmission data from the other end while re-storing the serial output therein by inputting the serial output from the one end, for applying to a serial bus the transmission data serially outputted from the transmission shift register as a serial data; a receiver portion including a reception shift register for serially inputting to the reception shift register the serial data on the serial bus as a reception data while sequentially shifting the serial data; and a comparison portion for executing an echo back comparison operation in which comparison is made between a transmission comparison data outputted from at least one predetermined bit out of the whole bits of the transmission shift register storing the transmission data and a reception comparison data outputted from at least one predetermined bit out of the whole bits of the reception shift register storing the reception data and having the same number of bits as the transmission comparison data to output an echo back signal, wherein the predetermined bits of the transmission and reception shift registers are determined in advance so that the transmission and reception comparison data correspond to each other, based on a delay time generated between a serial output timing from the transmission shift register and a serial input timing to the reception shift register.

The transmission shift register in the transmitter portion according to the present invention shifts the transmission data in the direction from one end to the other end of transmission data whereby the transmission data is serially outputted from the other end and the serial output is inputted from the one end to be re-stored therein. The transmission shift register thus has a function of holding the serial output.

The comparison portion employs the serial output held in the transmission shift register as transmission comparison data while employing the serial input held in the reception shift register as reception comparison data. Based on the delay time generated between the serial output timing from the transmission shift register and the serial input timing to the reception shift register, the comparison portion receives the corresponding transmission and reception comparison data. Comparison is made therebetween, so that the echo back comparison operation can be accurately achieved.

As a result, the necessity for providing the comparison portion with specialized registers is eliminated. The number of devices is accordingly decreased, so that the chip size can be reduced.

An object of the present invention is to provide a semiconductor integrated circuit device for communication, having an echo back comparison function for reduction in chip size.

DESCRIPTION OF THE PREFERRED EMBODIMENTS

Figure 1:
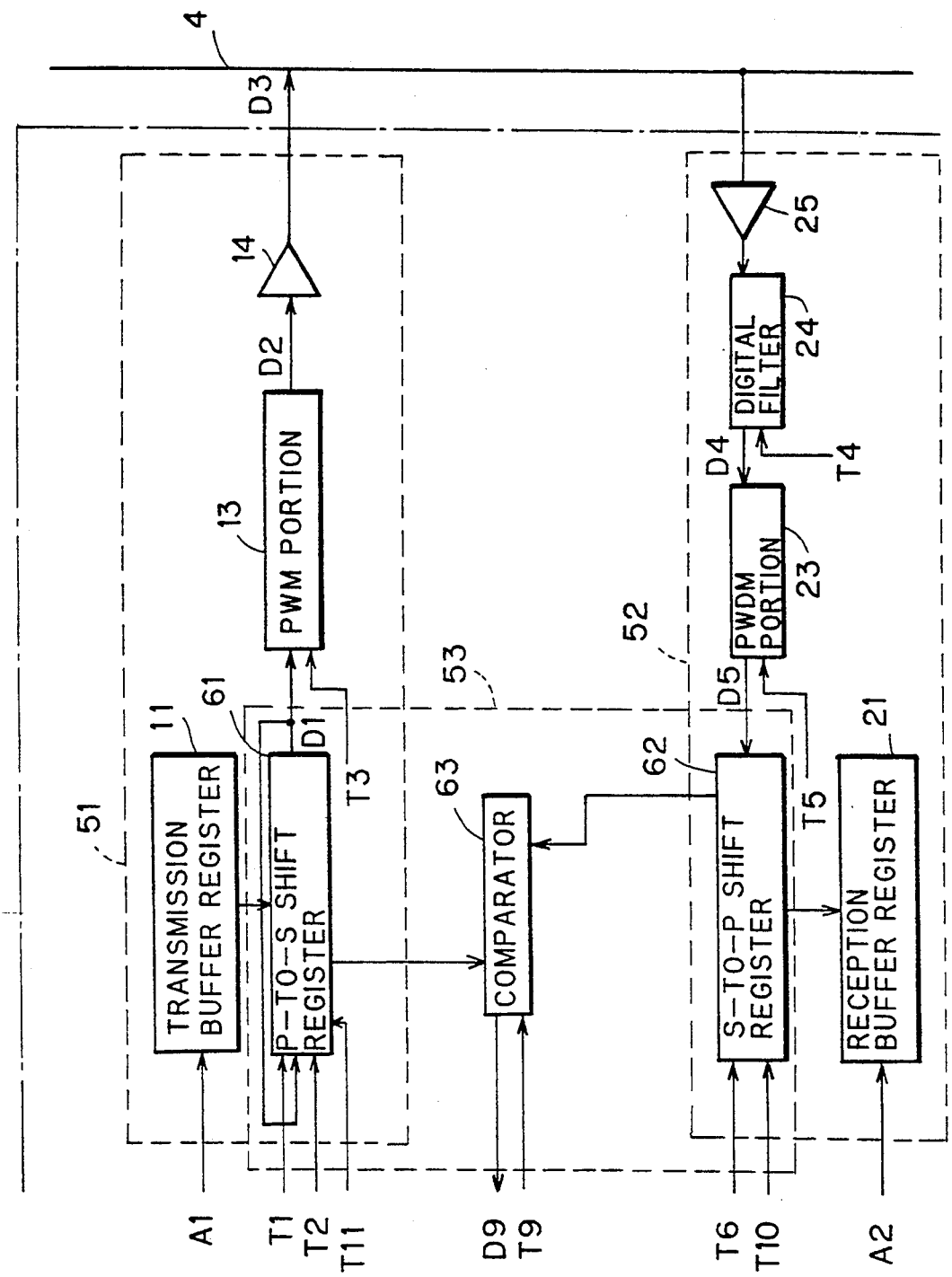
FIG. 1 is a block diagram of a transmitter-receiver portion of a communication LSI having an echo back comparison function according to a first preferred embodiment of the present invention.

FIG. 1 is a block diagram of the internal structure of a transmitter-receiver portion of a communication LSI having an echo back comparison function according to a first preferred embodiment of the present invention. The transmitter-receiver portion comprises a transmitter portion 51, a receiver portion 52 and a comparison portion 53. The transmitter portion 51 is connected to the receiver portion 52 through an external serial bus 4.

The transmitter portion 51 includes a transmission buffer register 11, a P-to-S shift register 61, a PWM portion 13 and a transmission buffer 14. A transmission buffer register address A1 indicative of a serial bus to the transmission buffer register 11. The transmission buffer register 11 outputs a 1-byte transmission data out of the transmission buffer register address A1 to the P-to-S shift register 61 in parallel. The P-to-S shift register 61, composed of nine bits of latches (or flip-flops) serially connected, receives the 1-byte (8-bits) transmission data out of the transmission buffer register address A1 in the transmission buffer register 11 in parallel and shifts the data of first to eighth latches to their adjacent second to last (or ninth) latches, to sequentially output the last latch data as a serial data D1 to the PWM portion 13. Simultaneously, the serial data D1 is transferred in a looped manner to the first latch. That is, the P-to-S shift register 61 outputs the serial data D1 while shifting and looping the transmission data.

The PWM portion 13 performs pulse width modulation on the serial data D1 to output a modulated serial data D2 to the transmission buffer 14. The transmission buffer 14 buffers the modulated serial data D2 to output a modulated serial data D3 having the same information as the modulated serial data D2 to the serial bus 4. The operation of the P-to-S shift register 61 is controlled by a transmission data load clock T1, a P-to-S shift register clock T2, and a reset signal T11. A PWM clock T3 controls the operation of the PWM portion 13.

The receiver portion 52 includes a reception buffer register 21, a S-to-P shift register 62, a PWDM portion 23, a digital filter 24, and a reception buffer 25. The reception buffer 25 buffers a serial data on the serial bus 4 and outputs it to the digital filter 24. The digital filter 24 performs a filtering processing for cutting off noise components on the output of the reception buffer 25 to output a serial data D4 to the PWDM portion 23. The PWDM portion 23 demodulates the serial data D4 to output a demodulated serial data D5 to the S-to-P shift register 62.

While the demodulated serial data D5 is serially inputted as a reception data to the first latch of the S-to-P shift register 62 in due order, the previously inputted data are shifted to the second and successive latches thereof. When a 1-byte reception data has been stored in the S-to-P shift register 62, the S-to-P shift register 62 outputs the reception data to the reception buffer register 21 in parallel.

A digital filter clock T4 controls the operation of the digital filter 24. A PWDM clock T5 controls the operation of the PWDM portion 23. A S-to-P shift register clock T6 and a reception data load clock T10 control the operation of the S-to-P shift register 62. A reception buffer address A2 is applied to the reception buffer register 21.

The comparison portion 53 includes a comparator 63, the P-to-S shift register 61 in the transmitter portion 51, and the S-to-P shift register 62 in the receiver portion 52. The comparator 63 compares the first latch data of the P-to-S shift register 61 with the first latch data of the S-to-P shift register 62 to output an echo back data D9.

Figure 2:
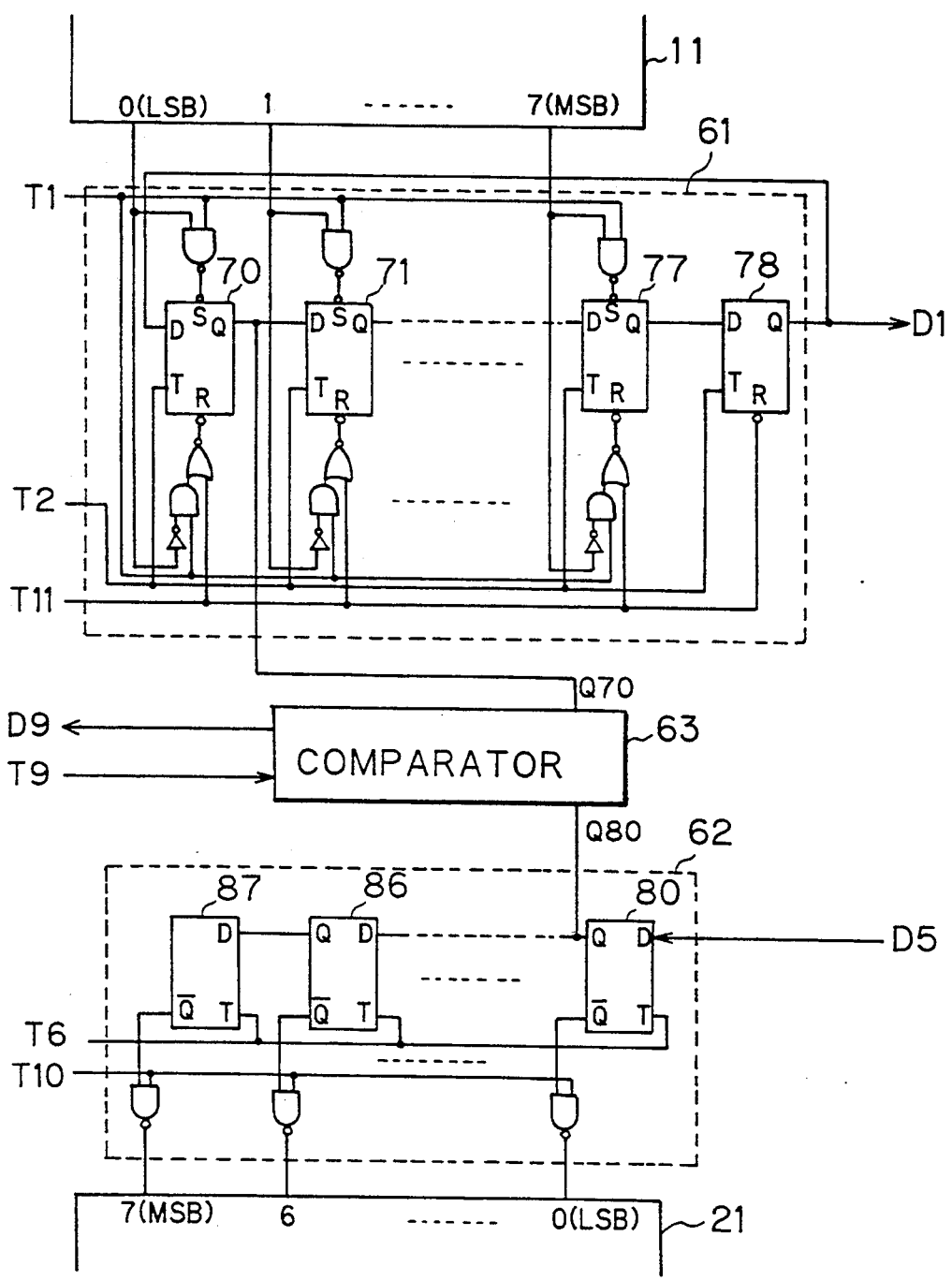
FIG. 2 illustrates a comparison portion and its vicinities shown in FIG. 1.

FIG. 2 illustrates the comparison portion 53 and its vicinities in detail. The P-to-S shift register 61 is composed of nine serially connected R-S-FFs (flip-flops) 70 to 78. Based on the value 1 or 0 of bit data B0 to B7 in the 1-byte data transferred from the transmission buffer register 11, the corresponding R-S-FFs 70 to 78 are set or reset, when the transmission data load clock T1 is at the H level. This provides the parallel transfer of the 1-byte transmission data from the transmission buffer register 11 to the P-to-S shift register 61.

At the H level rising edge of the P-to-S shift register clock T2, the latch data of the R-S-FFs 70 to 77 are shifted rightwardly to their adjacent R-S-FFs 71 to 78. Accordingly, the Q output of the R-S-FF 78 is outputted as serial data D1 and is also transferred in a looped manner to the D input of the R-S-FF 70. When the reset signal T11 rises to the H level, all of the R-S-FFs 70 to 78 are forced to be reset.

The S-to-P shift register 62 is composed of eight serially connected FFs 80 to 87. At the H level rising edge of the S-to-P shift register clock T6, the latch data of the FFs 80 to 86 are shifted leftwardly to their adjacent FFs 81 to 87, while the latest demodulate serial data D5 is inputted to the FF 80 as a D input. In the period in which the reception data load clock T10 is at the H level, the latch data (or the Q outputs) of the FFs 80 to 87 are transferred to the bit latches of the reception buffer register 21. This provides the parallel transfer of the 1-byte reception data from the S-to-P shift register 62 to the reception buffer register 21.

The comparator 63 compares the Q output of the R-S-FF 70 in the P-to-S shift register 61 with the Q output Q80 of the FF 80 in the S-to-P shift register 62, to output the echo back data D9 as a result of the comparison.

Figure 3:
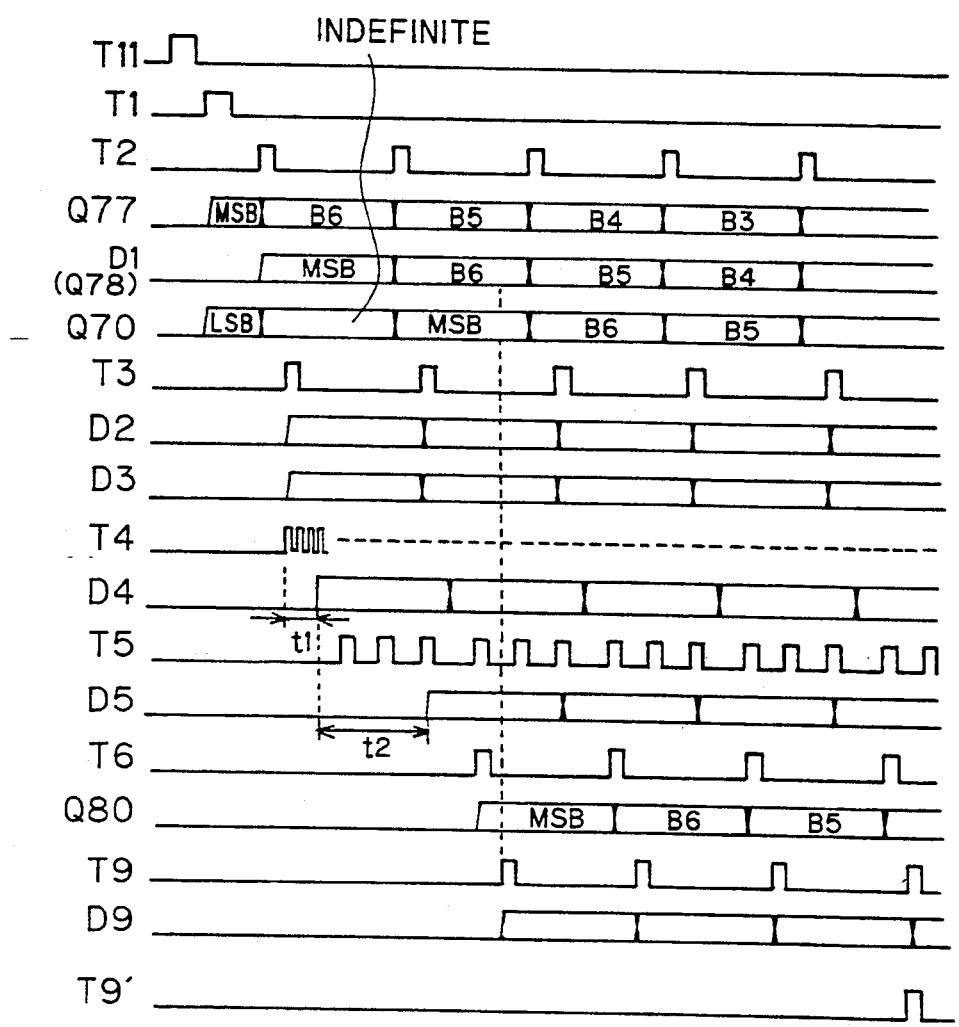
FIGS. 3 and 4 are timing charts partially showing the echo back comparison operation of the communication LSI according to the first preferred embodiment, respectively.

FIG. 3 is a timing chart partially showing the operation of the communication LSI shown in FIGS. 1 and 2. With reference to FIG. 3, the echo back comparison operation will be described hereinafter. Reference characters Q70, Q77 and Q80 designate the Q outputs of the FFs 70, 77 and 80, respectively.

Initially, the reset signal T1 is set to the H level for a predetermined period, so that all of the R-S-FFs 70 to 78 in the P-to-S shift register 61 are reset.

After the transmission buffer register address A1 is stored in the transmission buffer register 11, the transmission data load clock T1 being inputted to the P-to-S shift register 61 becomes the H level. In the period in which the clock T1 is at the H level, the transmission buffer register 11 outputs the 1-byte transmission data indicated by the transmission buffer register address A1 to the P-to-S shift register 61 in parallel (assuming that 1byte=8 bits). That is, the bit data stored in the transmission buffer register 11 are transferred in parallel to the R-S-FFs 70 to 77 of the P-to-S shift register 61, respectively.

The P-to-S shift register clock T2 becomes the H level. Triggered by the H level rising of the clock T2, the P-to-S shift register 61 shifts the latch data (or the Q outputs) of the R-S-FFs 70 to 77 rightwardly to their adjacent R-S-FFs 71 to 78, while the Q output of the R-S-FF 78 is serially outputted to the PWM portion 13 as serial data D1 and is transferred in a looped manner to the D input of the R-S-FF 70. Resultingly, the most significant output bit data (MSB=B7) in the inputted 1-byte transmission data is outputted to the PWM portion 13 as serial data D1. Subsequently, the H level rising of the clock T2 triggers the shift and loop transfer operations of the P-to-S shift register 61. Thus, the last latch data is transferred in a looped manner to the first latch, while the second most to least significant output bit data (B6 to LSB=B0) in the inputted 1-byte transmission data are sequentially outputted as serial data D1.

The PWM clock T3 becomes the H level. Triggered by the H level rising of the clock T3, the PWM portion 13 performs the pulse width modulation on the serial data D1 to output the modulated serial data D2 to the transmission buffer 14. Substantially simultaneously, the transmission buffer 14 outputs the modulated serial data D3 having the same information as the modulated serial data D2 to the serial bus 4.

The modulated serial data D3 on the serial bus 4 is transferred through the reception buffer 25 in the receiver portion 52 to the digital filter 24. Based on the digital filter clock T4, the digital filter 24 performs the filtering processing on the modulated serial data D3 to output the serial data D4 to the PWDM portion 23. Since the filtering processing requires the time t1, the output timing of the serial data D4 is delayed for the time t1 from the output timing of the modulated serial data D3.

The PWDM clock T5 rises to the H level. Based on the H level pulse of the clock T5, the PWDM portion 23 performs the pulse width demodulation on the serial data D4 to output the demodulated serial data D5 to the S-to-P shift register 62. The time t2 required for the demodulation processing is the delay time of the output timing of the demodulated serial data D5 from the output timing of the serial data D4.

The S-to-P shift register clock T6 rises to the H level. Triggered by the H level rising of the clock T6, the demodulated serial data D5 is serially inputted to the first latch of the S-to-P shift register 62. Subsequently, when triggered by the H level rising of the clock T6, the latest demodulated serial data D5 is serially inputted to the first latch of the S-to-P shift register 62 while the previously inputted data are shifted to the second and successive latches thereof.

After the 1-byte reception data is inputted to the latches of the S-to-P shift register 62, the reception data load clock T10 rises to the H level (not shown in FIG. 3). Triggered by the H level rising of the clock T10, the S-to-P shift register 62 outputs the inputted 1-byte reception data to the reception buffer register 21 in parallel.

Triggered by the H level rising of a comparison portion clock T9, the comparator 63 in the comparison portion 53 compares the first latch data of the P-to-S shift register 61, i.e., the Q output Q70 of the R-S-FF 70 with the first latch data of the S-to-P shift register 62, i.e., the Q output Q80 of the FF 80, to output the echo back data D9 as a result of the comparison. Based on the delay time of the serial input timing of the S-to-P shift register 62 from the serial output timing of the P-to-S shift register 61, which results from the filtering time t1 and the pulse width demodulation time t2 and the like, comparison is made between the first latch data Q70 of the P-to-S shift register 61, which is delayed by one clock of the clock T3 from the latch data Q78 in the appearance of the serial data D1 serially outputted from the P-to-S shift register 61, and the first latch data Q80, at which the latest demodulated serial data D5 in the S-to-P shift register 62 appears. This provides for the comparison of the corresponding bit data (B7 (MSB) to B0 (LSB)).

As described hereinabove, in the first preferred embodiment of the present invention, the Q output Q78 of the R-S-FF 78, i.e., the last latch of the P-to-S shift register 61 in the transmitter portion 51 is transferred in a looped manner to the D input of the R-S-FF 70, i.e., the first latch thereof, so that the capability of holding the serial data D1 is imparted to the P-to-S shift register 61.

As a result, the application of the P-to-S and S-to-P shift registers 61 and 62 as comparing registers in the comparison portion 53 does not interfere the echo back comparison operation while considering the delay time of the serial input timing of the S-to-P shift register 62 from the serial output timing of the P-to-S shift register 61. The necessity for providing the comparison portion 53 with specialized comparison registers is eliminated. The number of devices is accordingly decreased, so that the chip size can be reduced.

Since the P-to-S shift register 61 for receiving the 1-byte (8-bits) parallel input has the nine bits structure, the echo back comparison operation is not interferred by the parallel input from the transmission buffer register 11 to the R-S-FFs 70 to 77 and the serial output from the R-S-FF 78 to the PWM portion 13, both of which are performed simultaneously.

Figure 4:
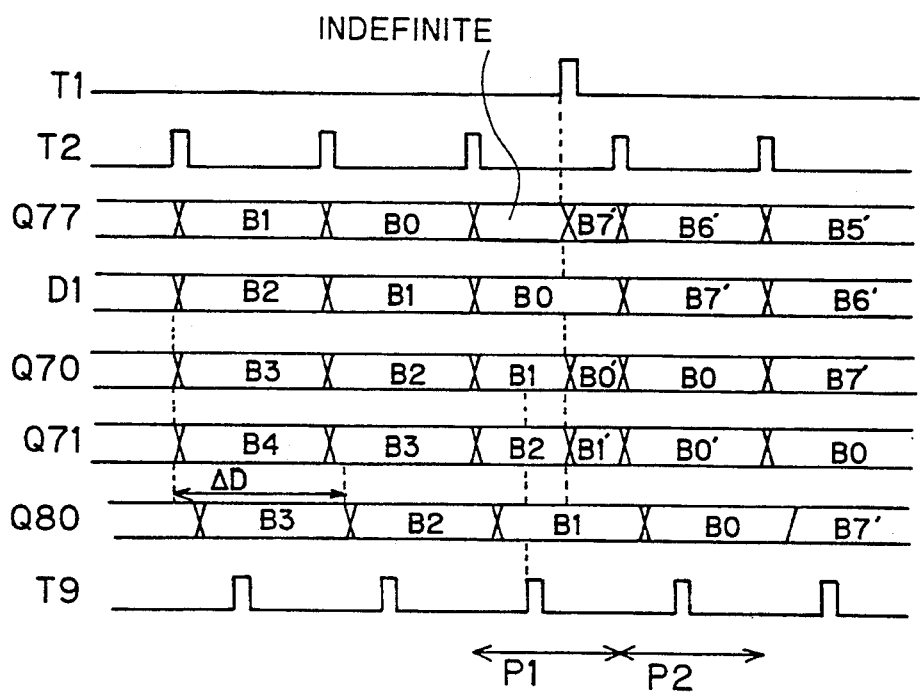

As shown in FIG. 4, for example, the H level rising of the comparison portion clock T9 is set before the H level rising of the transmission data load clock T1 in a serial output period P1 in which the least significant bit data B0 of the first 1-byte data (B7 to B0) is outputted as serial data D1. This affords the echo back comparison operation (between the outputs Q70 and Q80) of the bit data B1 of the first 1-byte data in the first half of the period P1 and the parallel output operation of the second 1-byte data (B7' to B0') to the P-to-S shift register 61 in the latter half thereof. In the next period P2 for the serial output, the most significant bit data B7' of the second 1-byte data is outputted as serial data D1, simultaneously with the echo back comparison operation of the least significant bit data B0 of the first 1-byte data. Reference character Q71 designates the Q output of the R-S-FF 71.

Figure 5:
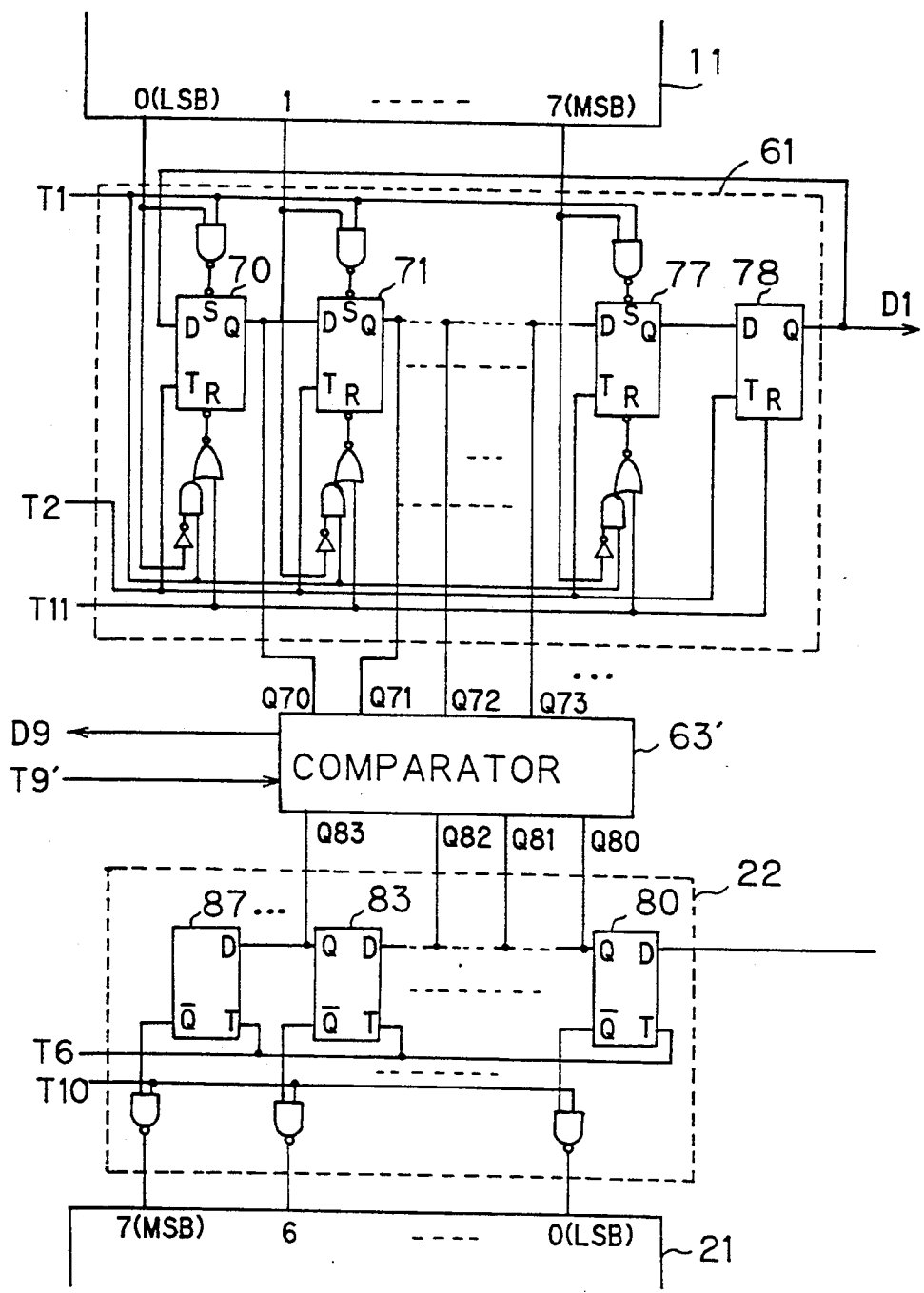
FIG. 5 illustrates the comparison portion and its vicinities of the communication LSI according to a second preferred embodiment of the present invention.
Figure 6:
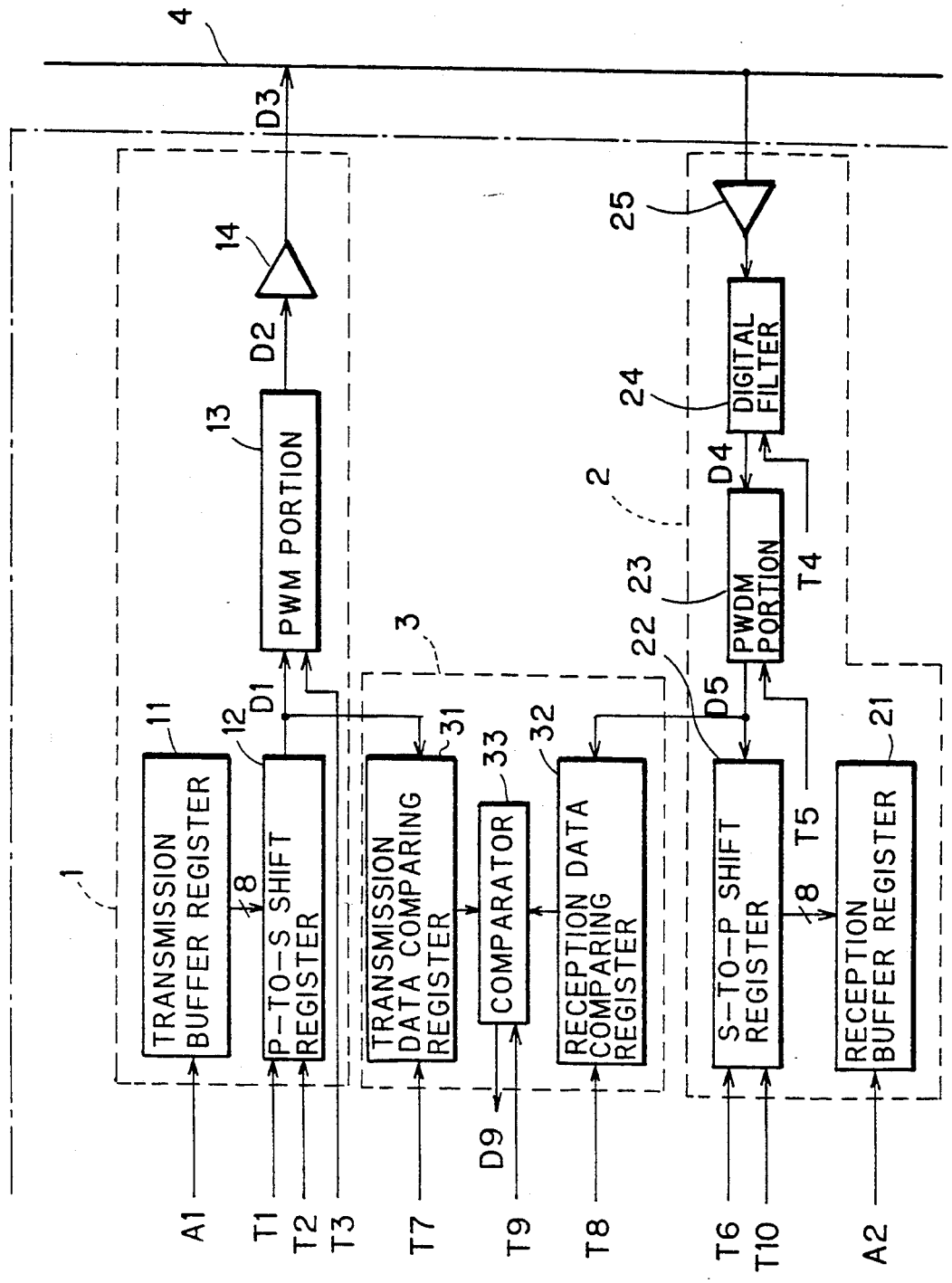
FIG. 6 is a block diagram of a transmitter-receiver portion of a conventional communication LSI having the echo back comparison function.
Figure 7:
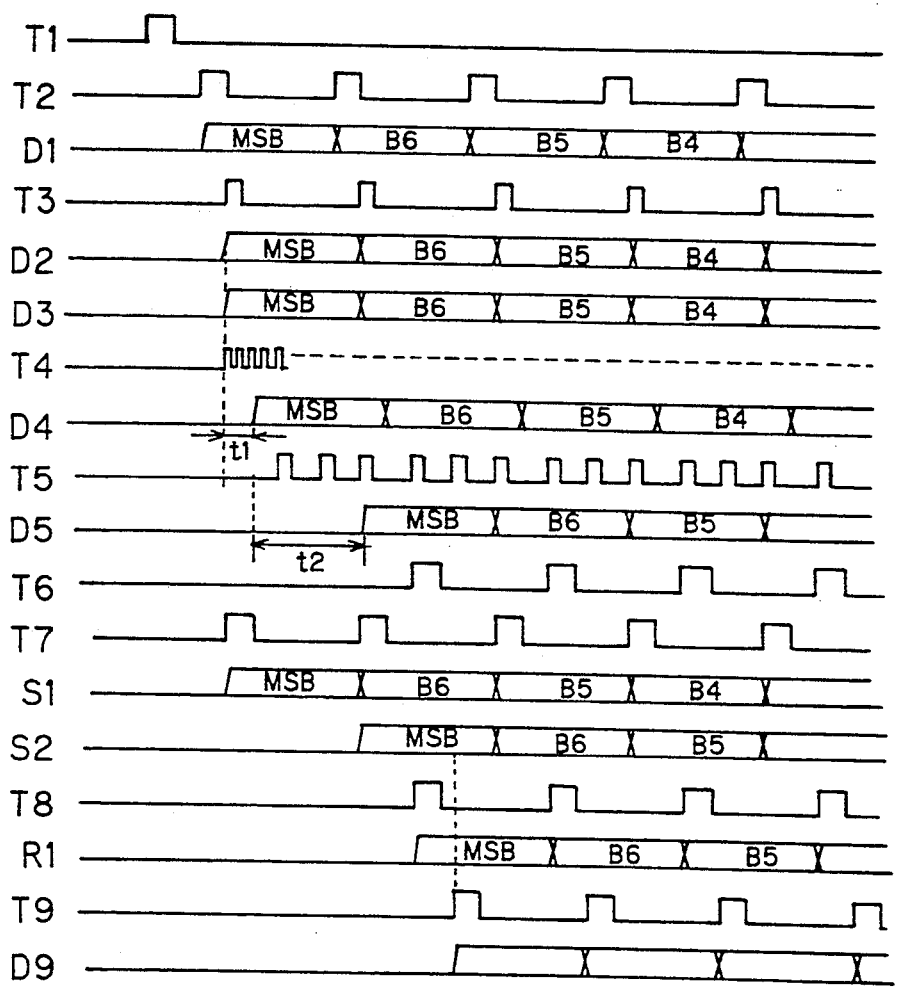
FIG. 7 is a timing chart showing the echo back comparison operation of the conventional communication LSI.

FIG. 5 illustrates the comparison portion and its vicinities of the communication LSI having the echo back comparison function in detail according to a second preferred embodiment of the present invention. Controlled by a comparison portion clock T9', a comparator 63' compares the first to fourth latch data of the P-to-S shift register 61, i.e., the Q outputs Q70 to Q73 of the R-S-FFs 70 to 73 with the first to fourth latch data of the S-to-P shift register 62, i.e., the Q outputs Q80 to Q83 of the FFs 80 to 83, respectively, to output the echo back data D9 as a result of the comparison. Since the other structures of the second preferred embodiment are similar to those of the first preferred embodiment shown in FIG. 2, the description thereof will be omitted. The total structure of the second preferred embodiment is similar to that of the first preferred embodiment shown in FIG. 1.

The echo back comparison operation in the communication LSI of the second preferred embodiment is executed in a substantially similar manner to that in the communication LSI of the first preferred embodiment. In the second preferred embodiment, however, four bits are processed as a unit in the echo back comparison. Hence, the comparison portion clock T9' is different in waveform from the comparison portion clock T9. As shown in FIG. 3, the first H level pulse of the comparison portion clock T9' is produced when the fourth H level pulse of the comparison portion clock T9 is produced.

The communication LSI of the second preferred embodiment performs the echo back comparison operation such that four bits are processed as a unit. The number of H level pulses of the comparison portion clock T9' is lower than the number of H level pulses of the comparison portion clock T9. Therefore, the second preferred embodiment is effective in that the dissipated power is reduced as compared with the first preferred embodiment.

While the invention has been shown and described in detail, the foregoing description is in all aspects illustrative and not restrictive. It is therefore understood that numerous modifications and variations can be devised without departing from the scope of the invention.

I claim:

1. A semiconductor integrated circuit device comprising:
   a transmitter portion including a transmission shift register, said transmission shift register shifting a stored transmission data having a predetermined number of bits in a direction from one end to the other end of said transmission shift register to serially output said transmission data from said other end while re-storing said serial output therein by inputting said serial output from said one end, for applying to a serial bus said transmission data serially outputted from said transmission shift register as a serial data;
   a receiver portion including a reception shift register for serially inputting to said reception shift register said serial data on said serial bus as a reception data while sequentially shifting said serial data; and
   a comparison portion for executing an echo back comparison operation in which comparison is made between a transmission comparison data outputted from at least one predetermined bit out of the whole bits of said transmission shift register storing said transmission data and a reception comparison data outputted from at least one predetermined bit out of the whole bits of said reception shift register storing said reception data and having the same number of bits as said transmission comparison data to output an echo back signal,
   wherein said predetermined bits of said transmission and reception shift registers are determined in advance so that said transmission and reception comparison data correspond to each other, based on a delay time generated between a serial output timing from said transmission shift register and a serial input timing to said reception shift register.

2. A semiconductor integrated circuit device in accordance with claim 1, wherein said transmission comparison data and said reception comparison data are each composed of one bit.

3. A semiconductor integrated circuit device in accordance with claim 1, wherein said transmission comparison data and said reception comparison data are each composed of a plurality of bits.

4. A semiconductor integrated circuit device in accordance with claim 1, wherein said transmission shift register and said reception shift register are each composed of serially connected flip-flops and wherein an output of the last flip-flop of said transmission shift register is transferred in a looped manner to an input of the first flip-flop thereof.

5. A semiconductor integrated circuit device in accordance with claim 4, wherein said transmission shift register has a parallel input and a serial output and wherein said reception shift register has a serial input and a parallel output.

6. A semiconductor integrated circuit device in accordance with claim 5, wherein the number of serially connected flip-flops of said transmission shift register is the number of bits of said transmission data plus one, the last flip-flop being used for the serial output, the other flip-flops being used for the parallel input.

* * * * *